(No Model.)
L. GARDNER & N. REID.
TOOL FOR SETTING UP BENT TEETH OF CARD CLOTHING.
No. 443,253. Patented Dec. 23, 1890.
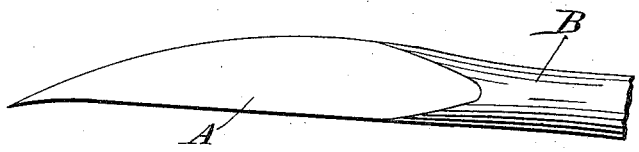
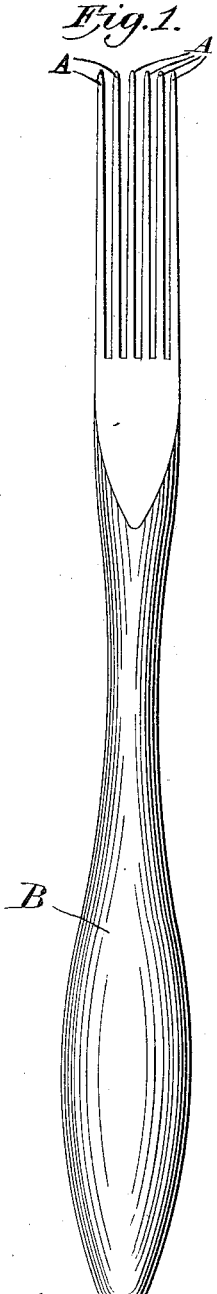
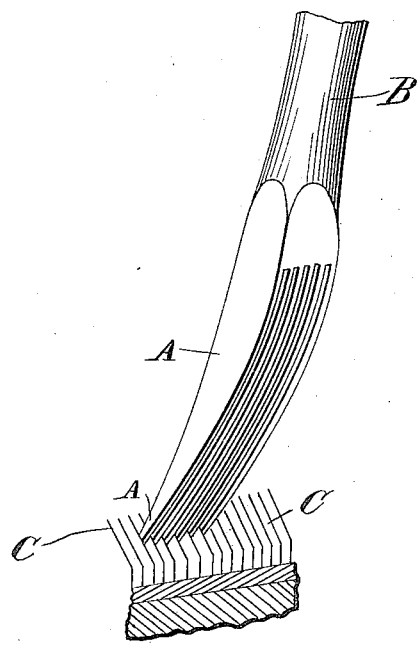
Witnesses:
Chas. E. Cochran
Inventor.
Leavis Gardner
Nicholas Reid

UNITED STATES PATENT OFFICE.

LOUIS GARDNER AND NICHOLAS REID, OF MANCHESTER, NEW HAMPSHIRE.

TOOL FOR SETTING UP BENT TEETH OF CARD-CLOTHING.

SPECIFICATION forming part of Letters Patent No. 443,253, dated December 23, 1890.

Application filed November 13, 1889. Serial No. 330,235. (No model.)

*To all whom it may concern:*

Be it known that we, LOUIS GARDNER and NICHOLAS REID, of the city of Manchester, county of Hillsborough, and State of New Hampshire, have invented certain new and useful Improvements in Tools for Setting Up Bent Teeth of Card-Clothing, of which the following is a specification.

Our invention relates to improvements in tools for setting up bent teeth of card-clothing.

Figure 1 is a front elevation of a tool constructed in accordance with our invention. Fig. 2 is a side view of the same, showing the shape of the tines with the handle broken away. Fig. 3 is a perspective view of the tool with the handle broken away.

In all the figures like letters are employed to designate corresponding parts.

A indicates the tines of the tool, which are flat, thin, pointed at the end, and slightly convex on the bottom. B, the handle, may be of any ordinary preferred form.

In use the tines are pressed under the jammed teeth of the card-clothing and twisted to the left. The width of the tines brings the teeth up to the correct height, and the twist to the left sets the teeth back in shape.

We claim as our invention—

The herein-described tool for setting up bent teeth of card-clothing, consisting of the handle and the flat thin pointed tines A, substantially as and for the purpose set forth.

Signed at Manchester, in the county of Hillsborough and State of New Hampshire, this 2d day of November, A. D. 1889.

LOUIS GARDNER.
NICHOLAS REID.

Witnesses:
THOS. T. HASKIN,
ISAAC L. HEATH.